United States Patent
Asadi-Zanjani et al.

(10) Patent No.: US 12,437,388 B2
(45) Date of Patent: Oct. 7, 2025

(54) SYSTEM AND METHOD FOR COMPUTER INSPECTION OF SURFACE-MOUNT DEVICES

(71) Applicant: University of Florida Research Foundation, Incorporated, Gainesville, FL (US)

(72) Inventors: Navid Asadi-Zanjani, Gainesville, FL (US); Mark M. Tehranipoor, Gainesville, FL (US); Nathan Jessurun, Gainesville, FL (US); Jacob C. Harrison, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 333 days.

(21) Appl. No.: 18/328,306

(22) Filed: Jun. 2, 2023

(65) Prior Publication Data
US 2023/0394645 A1    Dec. 7, 2023

Related U.S. Application Data

(60) Provisional application No. 63/365,966, filed on Jun. 7, 2022.

(51) Int. Cl.
*G06K 9/00* (2022.01)
*G06T 7/00* (2017.01)
*G06T 7/11* (2017.01)
*G06T 7/564* (2017.01)

(52) U.S. Cl.
CPC .............. *G06T 7/0004* (2013.01); *G06T 7/11* (2017.01); *G06T 7/564* (2017.01); *G06T 2207/20081* (2013.01); *G06T 2207/30141* (2013.01)

(58) Field of Classification Search
CPC .. H01J 37/28; H01J 37/244; H01J 2237/2817; H01J 2237/202; H01J 37/20; H01J 2237/2806; H01J 2237/082; H01J 2237/20228; H01J 2237/204; H01J 2237/22; H01J 2237/2446; H01J 2237/24564; H01J 2237/2816; H01J 37/06; H01J 37/073; H01J 37/185; H01J 37/222; H01J 49/0031; H01J 49/0036; G06V 10/764; G06V 10/82
See application file for complete search history.

(56) References Cited

U.S. PATENT DOCUMENTS

| | | | |
|---|---|---|---|
| 6,225,012 B1 * | 5/2001 | Nishi | G03F 9/7011 430/30 |
| 7,365,005 B1 * | 4/2008 | Gadgil | C23C 16/045 257/E21.585 |
| 7,924,226 B2 * | 4/2011 | Soler Castany | H01Q 1/38 343/702 |

* cited by examiner

*Primary Examiner* — Alex Kok S Liew
(74) *Attorney, Agent, or Firm* — Alston & Bird LLP

(57) ABSTRACT

Various embodiments provide computer vision techniques for ensuring system- and component-level integrity via component characterization. Various embodiments may comprise computer vision systems that are configured to extract pin information from surface-mount device ("SMD") contours. Accordingly, the disclosed embodiments may include a computer vision system configured to detect the extremities of each pin in a SMD contour image based on a combination of at least one of machine learning and one or more PCB image collection datasets.

20 Claims, 13 Drawing Sheets

| Category | Example contour(s) | Description |
|---|---|---|
| Package traits | | Grooves, notches |
| Pin traits | | Diagonal pins, large pin size differentials |
| Annotation quality | | Polygon artifacts, segmentation byproducts |
| Domain knowledge | | Underspecified definition of "pin" |
| PinPoint deficiencies | | Pins on side extrema only |

FIG. 13

SYSTEM AND METHOD FOR COMPUTER INSPECTION OF SURFACE-MOUNT DEVICES

CROSS REFERENCE TO RELATED APPLICATION

This application claims the priority of U.S. Provisional Application No. 63/365,966, entitled "SYSTEM AND METHOD FOR COMPUTER INSPECTION OF SURFACE-MOUNT DEVICES," filed on Jun. 7, 2022, the disclosure of which is hereby incorporated by reference in its entirety.

TECHNOLOGICAL FIELD

The present disclosure generally relates to the technical field of computer vision. In particular, the present disclosure relates to applying computer vision to identify surface-mount device pin locations.

BACKGROUND

Printed circuit boards (PCBs) form the structural and electrical backbone of modern electronic systems. A populated PCB assembly (PCBA) may be mounted with discrete electrical components to form an electronic system. An engineer designing such a system ensures that each component (and the PCB itself) meets functional and parametric specifications, where any one of a multitude of oversights could lead to critical system faults. Integrated circuits (ICs) placed onto a PCB are also required to meet manufacturer-specified physical dimensions. Critical dimensions include, but are not limited to, pin width, pin spacing, pin length, pin shape/depth (e.g., the way that a pin "bends down" to contact the board), and package dimensions. If an IC's dimensions fall outside of manufacturer-tolerances, this could create problems when the IC is placed onto a PCB during assembly. As such, IC manufacturers and PCB assemblers ensure that each component of an electronic system satisfies its specification.

After design and validation, PCB fabrication, component placement, and system assembly may be outsourced. However, untrustworthy manufacturers may attempt to save costs by substituting counterfeit components for legitimate ones, thereby introducing critical faults. Even worse, a system design could be deliberately modified to introduce faults (e.g., "trojan" hardware). Electronics counterfeiting is a large industry, and counterfeits harm system reliability and security. Accordingly, system components are checked against their specifications to verify their authenticity.

Acceptance testing to assure complex systems against such threats is challenging. Today, the state-of-practice involves costly, unscalable manual inspection, such as PCB assurance strategies via automated optical inspection (AOI) and extraction of bill of materials (BoM) properties. For example, components in a system may have a number of automatically computable properties (e.g., package text, pin count, package dimensions, package texture, and other applicable properties) that, if they match expected values, constitute evidence that a board has been populated with authentic components according to the designer's specification. The tremendous variety of component classes, package types, and manufacturers prevent generalized BoM extraction methods from achieving high performance on granular tasks. Furthermore, ICs possess significantly more metadata than passive components.

BRIEF SUMMARY

PCBAs face growing security threats as globalization and outsourcing increases. As a result, corresponding increases in assurance countermeasures are critical. Accordingly, various embodiments of the present disclosure provide computer vision techniques for ensuring system- and component-level integrity via component characterization. Various embodiments may comprise computer vision systems that are configured to extract pin information from surface-mount device (SMD) contours. Accordingly, the disclosed embodiments may include a computer vision system configured to detect the extremities of each pin in a SMD contour image based on a combination of at least one of machine learning and one or more PCB image collection datasets. Additional embodiments described herein include computer vision systems configured to extract information about SMD packages, such as pin widths/lengths, spacing, and symmetry, to compare against datasheet specifications. Accordingly, various embodiments of the present disclosure may be applied to provide pin and other component-level statistics enabling further analysis of such properties.

PCB assemblers or IC packagers may use various embodiments of the present disclosure for quality assurance to ensure that parts conform to tolerances. For example, various embodiments of the present disclosure may improve PCB assembly facilities' use of automated optical inspection both when placing components (e.g., to ensure proper orientation), and when inspecting the final assembly for quality. Accordingly, a system designer could use various embodiments of the present disclosure to assist in acceptance testing after they receive a PCBA from their assembler. Various embodiments of the present disclosure may also be used to assist in reverse engineering a PCBA. As an example, if a system contains an old PCB and the original schematics for the board have been lost, the ability to find pins (as discussed in the present disclosure) could be used in conjunction with other tools that automatically establish how components are connected.

The ability to quickly verify IC package and pin dimensions via computer vision systems of the presently disclosed embodiments may help PCB assemblers and system designers to find and eliminate counterfeit parts. Another type of counterfeiting includes removing used components from one system and selling the components as new. Often, such components are damaged during the removal process. For example, pins may become bent when the part is removed from its original system. Various embodiments of the present disclosure could also help to identify this type of counterfeit by finding anomalies in pin positioning.

In general, various embodiments of the present disclosure provide methods, apparatus, systems, computing devices, computing entities, and/or the like for identifying SMD pin locations.

In some embodiments, a method comprises: receiving, by a computing device, input contour data associated with a SMD; determining, by the computing device, a plurality of bounding box quadrants for the input contour data; aligning, by the computing device, a bounding box around a body of the SMD, wherein the bounding box comprises the plurality of bounding box quadrants; extracting, by the computing device, pin profiles from the input contour data based on the alignment of the bounding box; detecting, by the computing device, signal peak indices from the pin profiles; mapping, by the computing device, the signal peak indices to pin locations associated with the SMD; and generating, by the computing device, output contour data comprising the mapping.

In some embodiments, the input contour data comprises component segmentations of an image of the SMD. In some embodiments, the method further comprises generating the input contour data by at least one of: machine learning annotation, neural network outputs, laser interferometry, stereophotogrammetry, light detection and ranging ("LIDAR"), and time-of-flight acquisition. In some embodiments, the method further comprises generating the input contour data by using a machine learning model trained based on a printed circuit board ("PCB") image collection dataset, the PCB image collection data including unique PCB images including semantic contours, logo, text, and orientation information. In some embodiments, determining the plurality of bounding box quadrants further comprises fitting the input contour data to a rectangular profile to encapsulate the SMD. In some embodiments, the plurality of bounding box quadrants comprises left, right, top, and bottom quadrants that group contour coordinates of the SMD based on a side of the body of the SMD the contour coordinates occupy. In some embodiments, the method further comprises comprising grouping a given one of the contour coordinates based on an angle between the given contour coordinate and a center of the bounding box. In some embodiments, the method further comprises further comprising labeling the contour coordinates based on the side of the body of the SMD the contour coordinates occupy. In some embodiments, aligning the bounding box further comprises subtracting from each side a variance corresponding to a given portion of contour points. In some embodiments, extracting the pin profiles further comprises re-orientating and converting contour details from sides of the SMD into one or more signal representations. In some embodiments, detecting the signal peak indices further comprises executing a peak-finding algorithm to locate the signal peak indices. In some embodiments, mapping the signal peak indices to pin locations further comprises generating output contour data comprising labeling or indicia superimposed over the input contour data.

In some embodiments, a computing apparatus comprises memory and one or more processors communicatively coupled to the memory, the one or more processors configured to receive input contour data associated with a surface-mount device (SMD); determine a plurality of bounding box quadrants for the input contour data; align a bounding box around a body of the SMD, wherein the bounding box comprises the plurality of bounding box quadrants; extract pin profiles from the input contour data based on the alignment of the bounding box; detect signal peak indices from the pin profiles; map the signal peak indices to pin locations associated with the SMD; and generate output contour data comprising the mapping.

In some embodiments, the one or more processors are further configured to fit the input contour data to a rectangular profile to encapsulate the SMD. In some embodiments, the one or more processors are further configured to subtract from each side of the bounding box a variance corresponding to a given portion of contour points. In some embodiments, the plurality of bounding box quadrants comprises left, right, top, and bottom quadrants that group contour coordinates of the SMD based on a side of the body of the SMD the contour coordinates occupy. In some embodiments, the one or more processors are further configured to group a given one of the contour coordinates based on an angle between the given contour coordinate and a center of the bounding box. In some embodiments, the one or more processors are further configured to re-orientate and convert contour details from sides of the SMD into one or more signal representations. In some embodiments, the one or more processors are further configured to generate output contour data comprising labeling or indicia superimposed over the input contour data.

In some embodiments, one or more non-transitory computer-readable storage media including instructions that, when executed by one or more processors, cause the one or more processors to receive input contour data associated with a surface-mount device (SMD); determine a plurality of bounding box quadrants for the input contour data; align a bounding box around a body of the SMD, wherein the bounding box comprises the plurality of bounding box quadrants; extract pin profiles from the input contour data based on the alignment of the bounding box; detect signal peak indices from the pin profiles; map the signal peak indices to pin locations associated with the SMD; and generate output contour data comprising the mapping.

BRIEF DESCRIPTION OF THE DRAWINGS

Having thus described the present disclosure in general terms, reference will now be made to the accompanying drawings, which are not necessarily drawn to scale.

Figure 1:
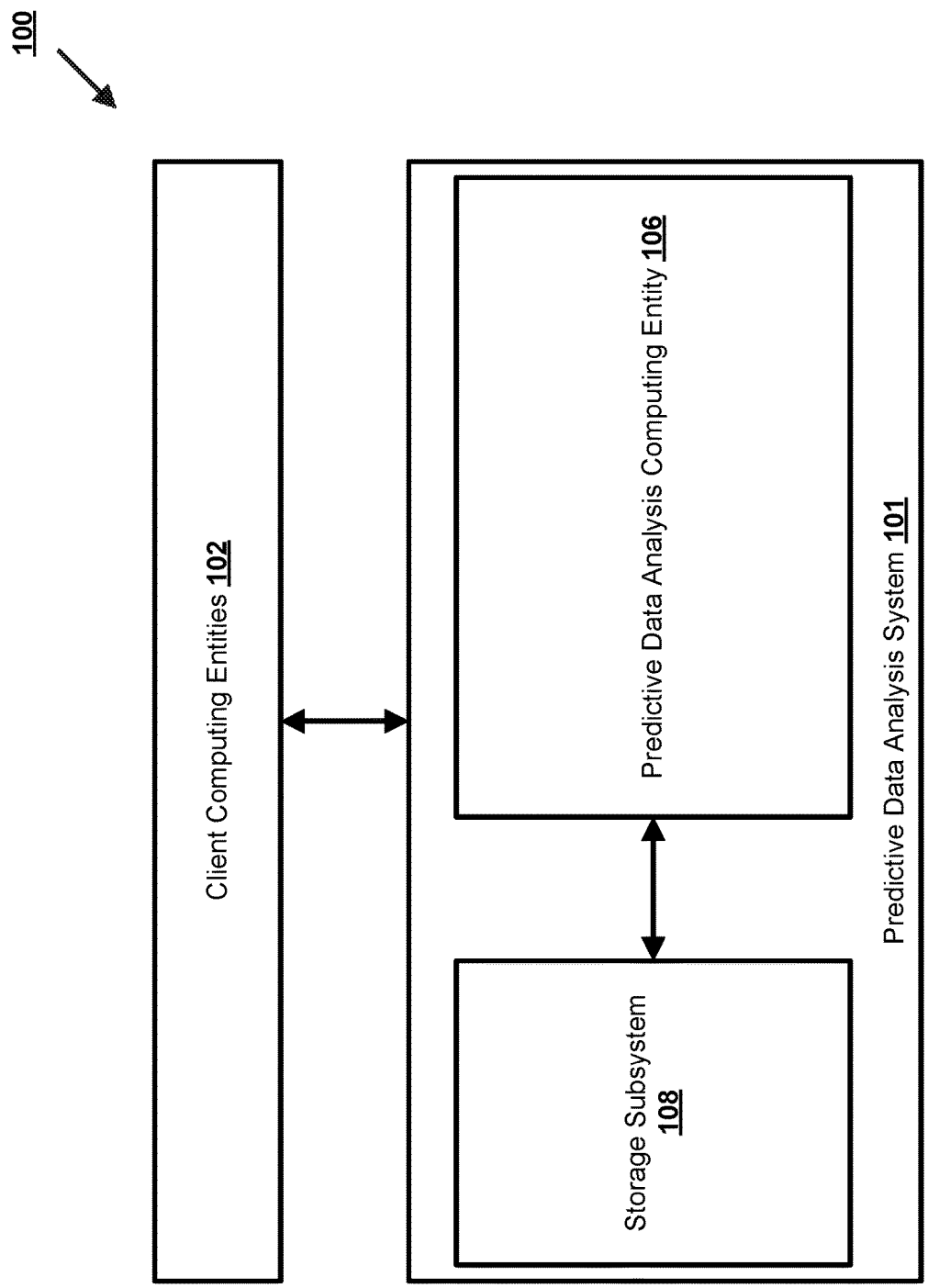

FIG. 1 illustrates an example overview of an architecture that can be used to practice embodiments of the present invention.

Figure 2:
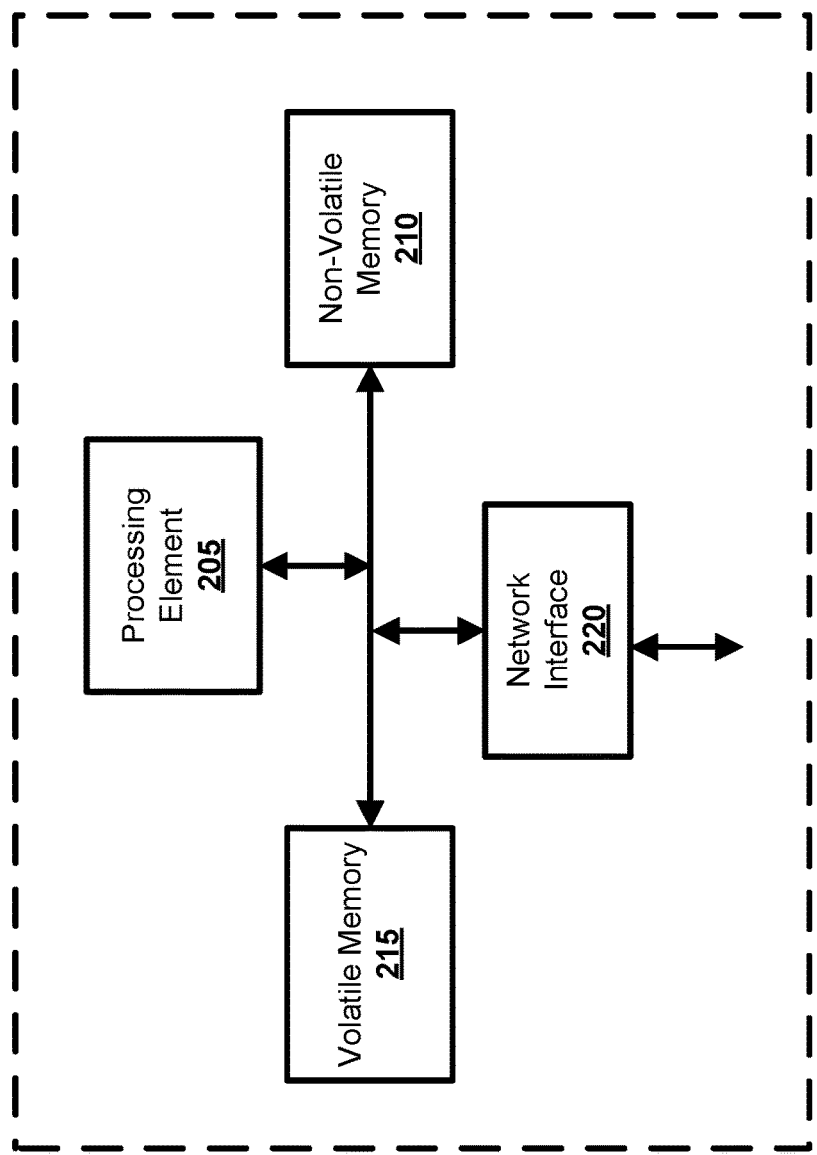

FIG. 2 illustrates an example predictive data analysis computing entity in accordance with some embodiments discussed herein.

Figure 3:
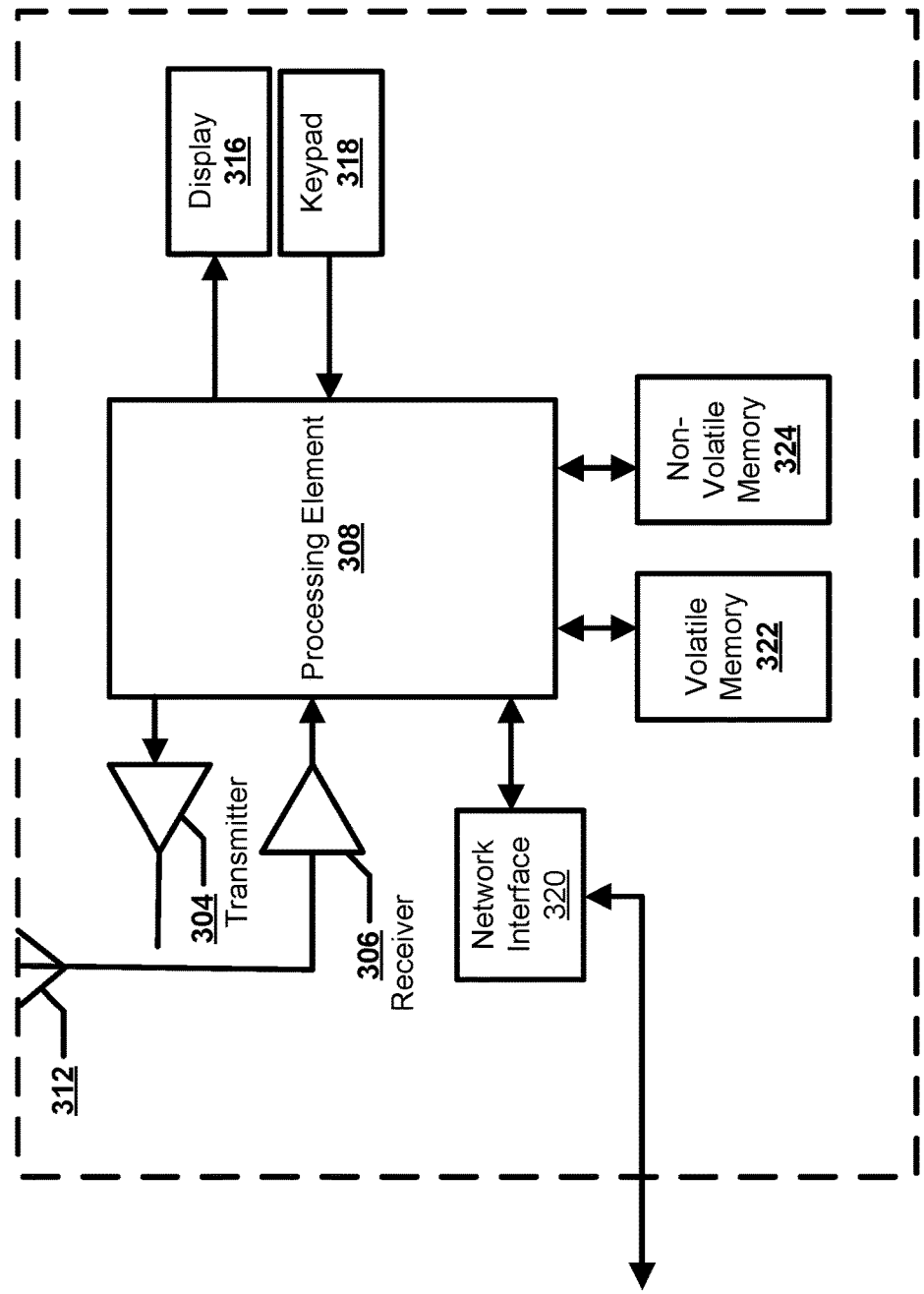

FIG. 3 illustrates an example client computing entity in accordance with some embodiments discussed herein.

Figure 4:
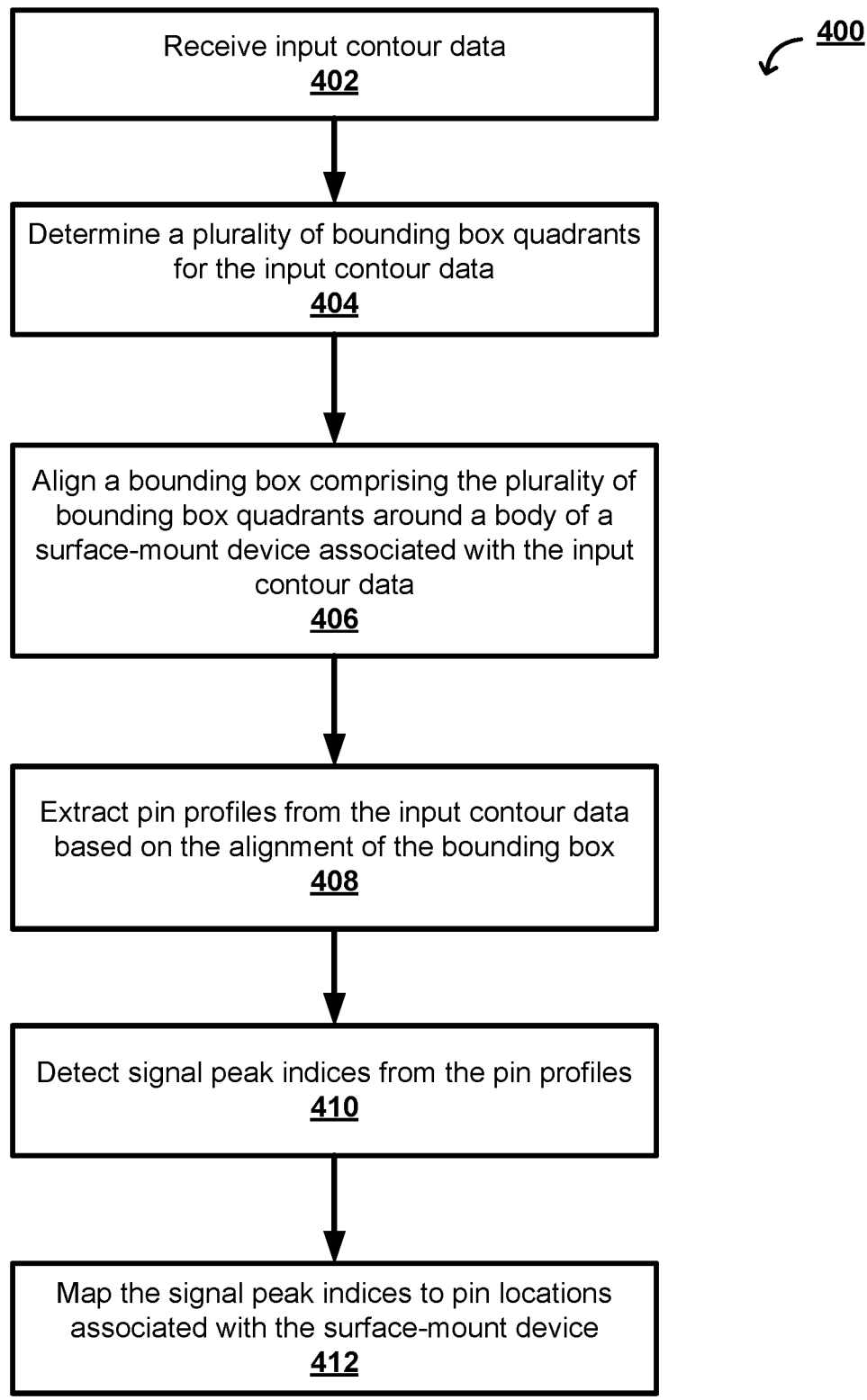

FIG. 4 illustrates a flowchart of an example process for locating SMD pin locations in accordance with various embodiments of the present disclosure.

Figure 5:
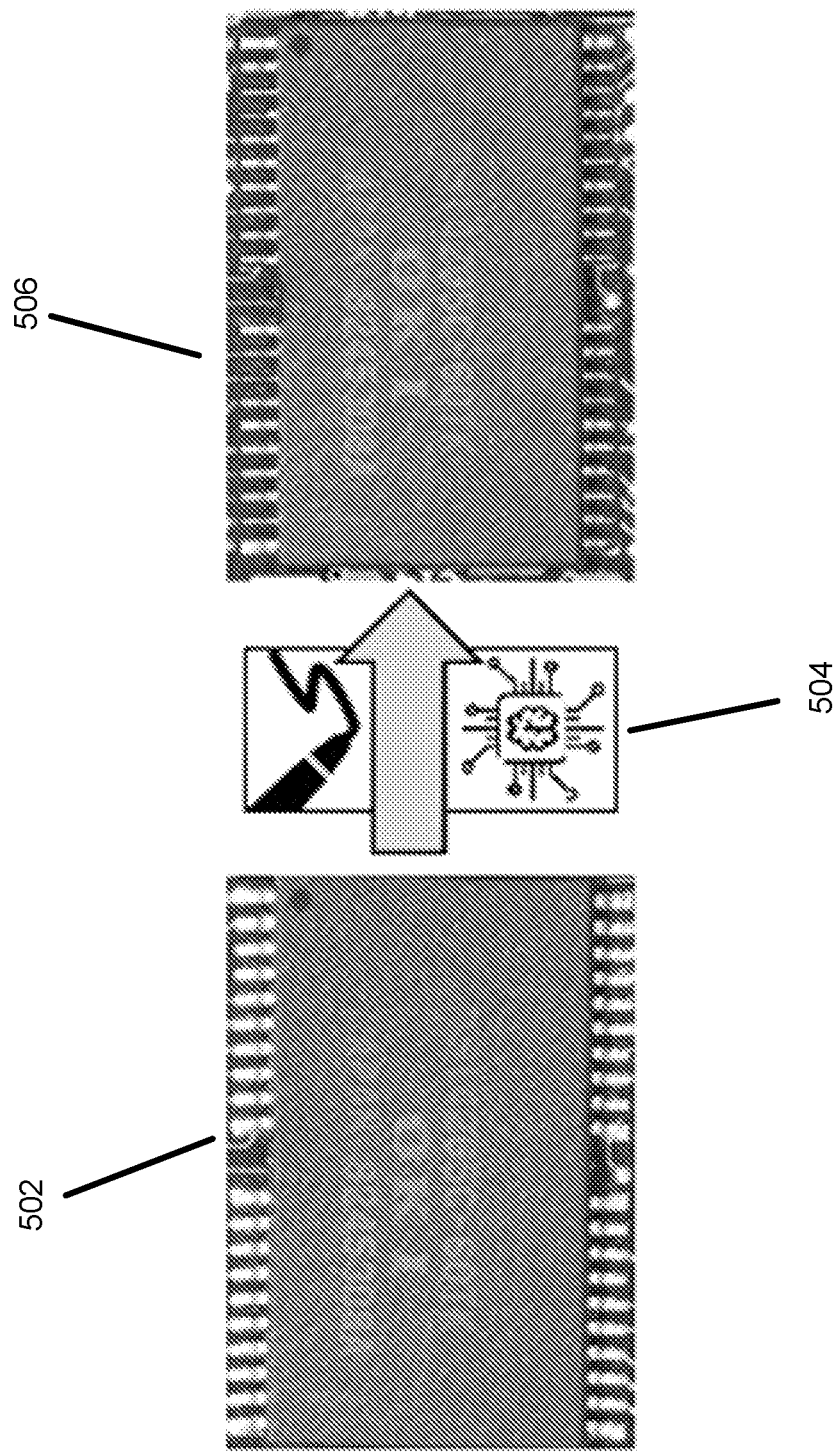

FIG. 5 illustrates example input contour data in accordance with some embodiments discussed herein.

Figure 6:
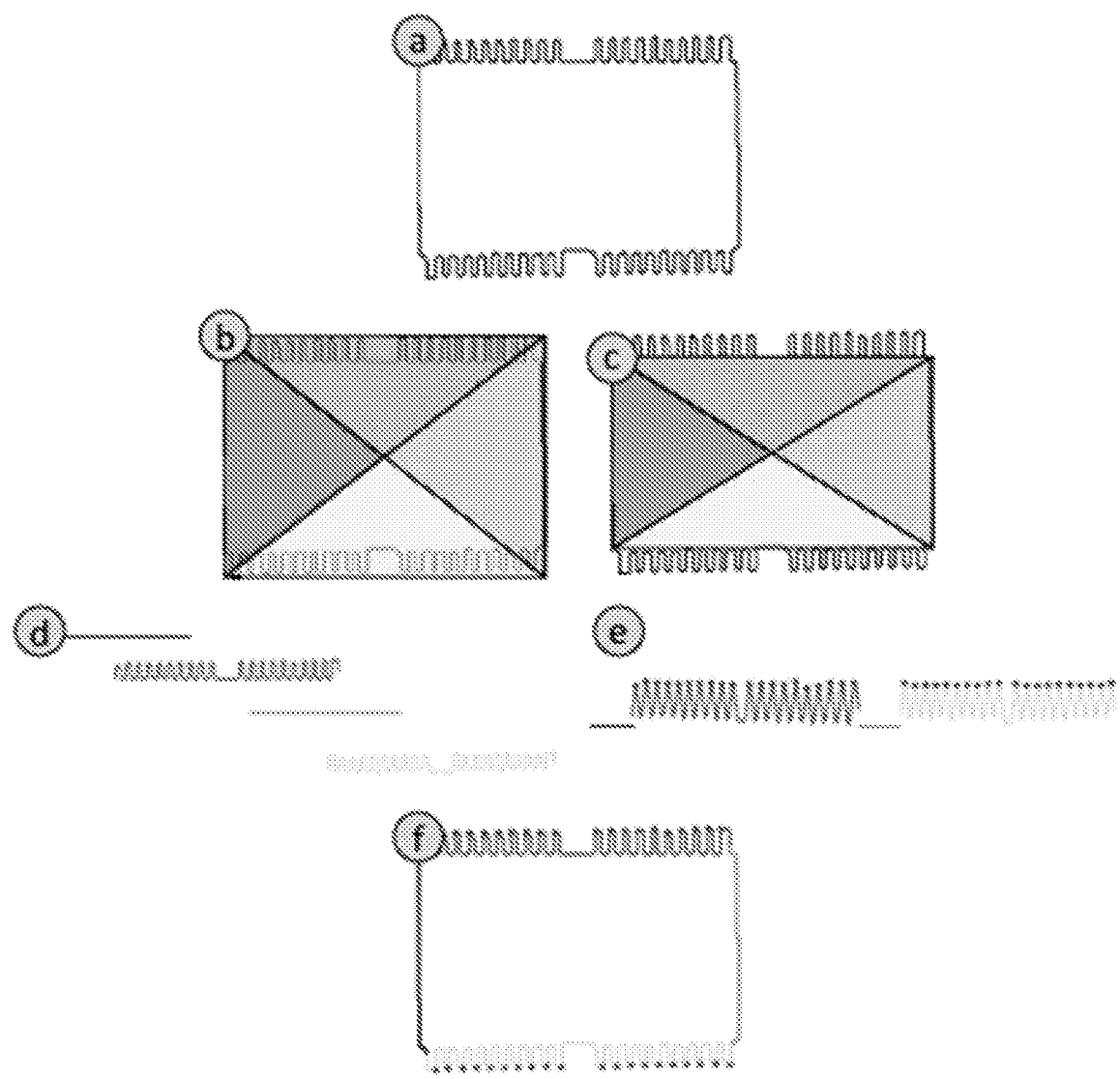

FIG. 6 illustrates example graphical depictions of output from stages of locating SMD pin locations in accordance with some embodiments discussed herein.

Figure 7:
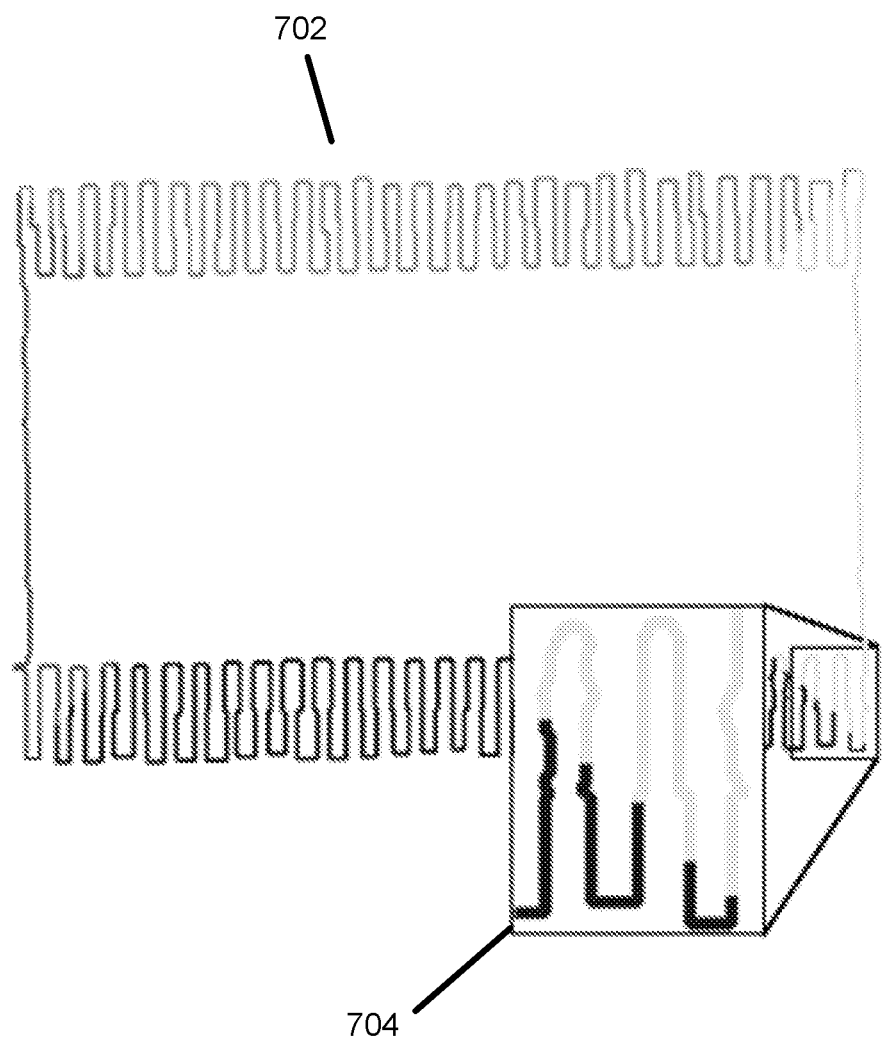

FIG. 7 illustrates example pin contour in accordance with some embodiments discussed herein.

Figure 8:
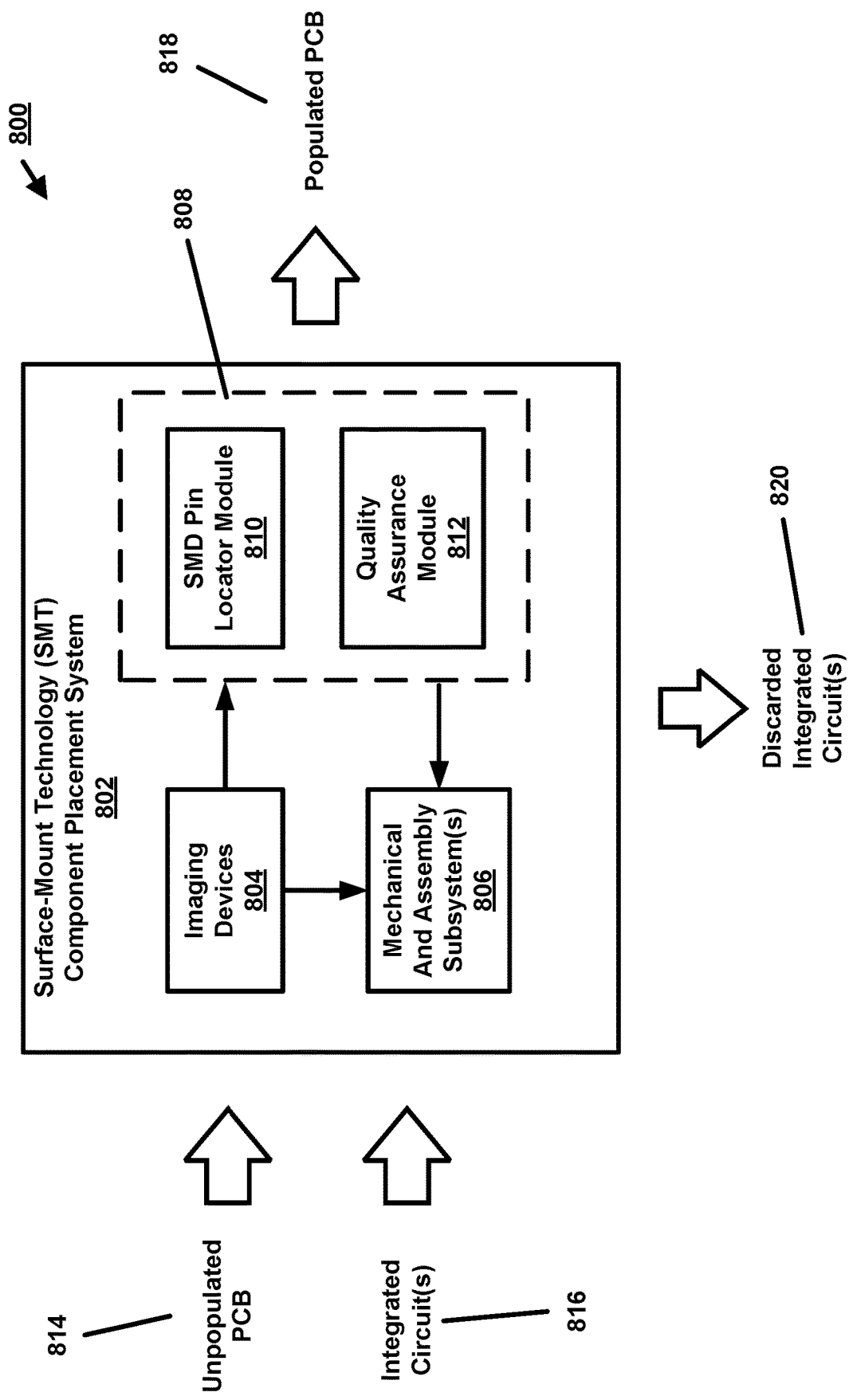

FIG. 8 illustrates an example system for inspecting SMDs in accordance with some embodiments discussed herein.

Figure 9:
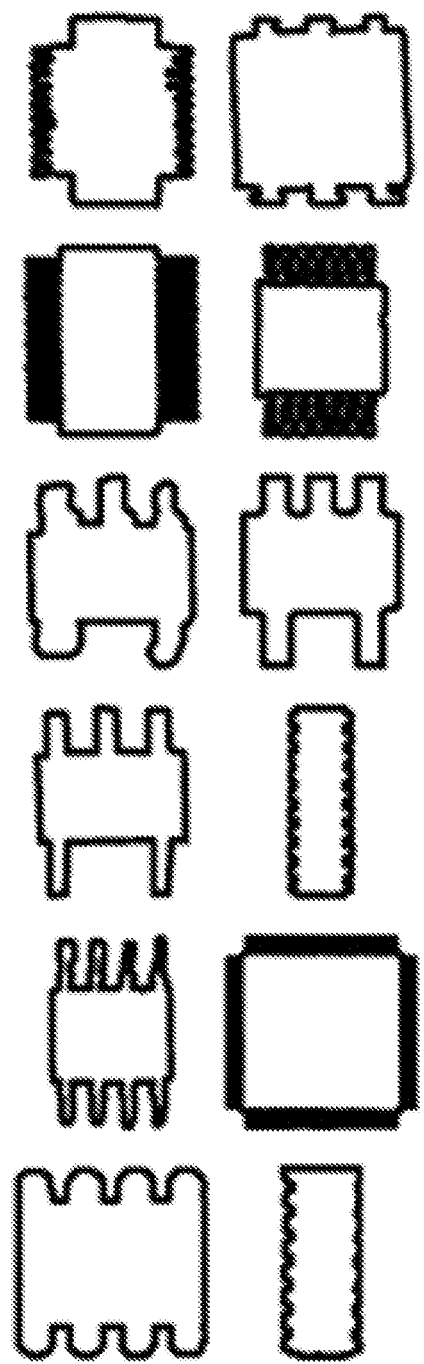
Figure 10:
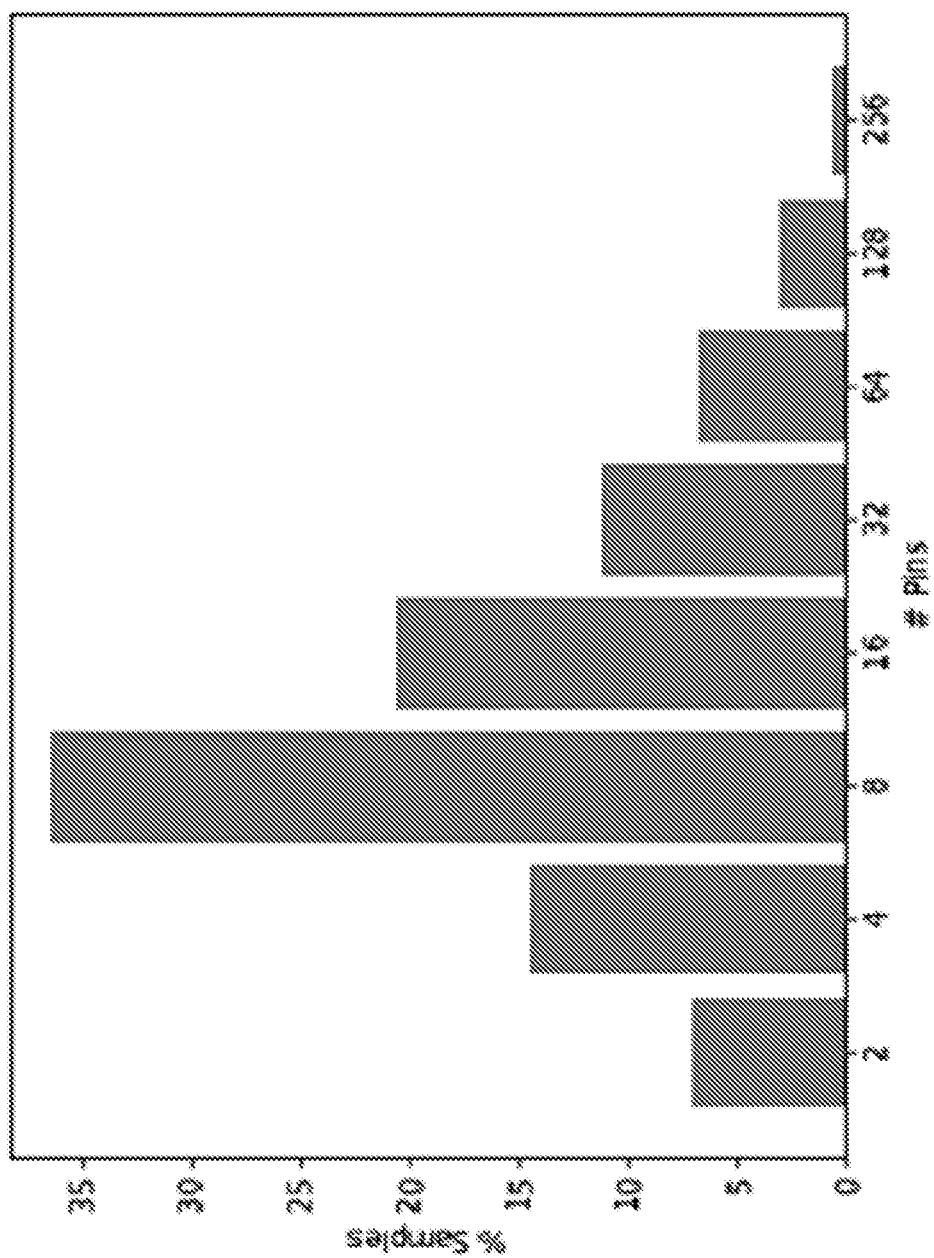
Figure 11:
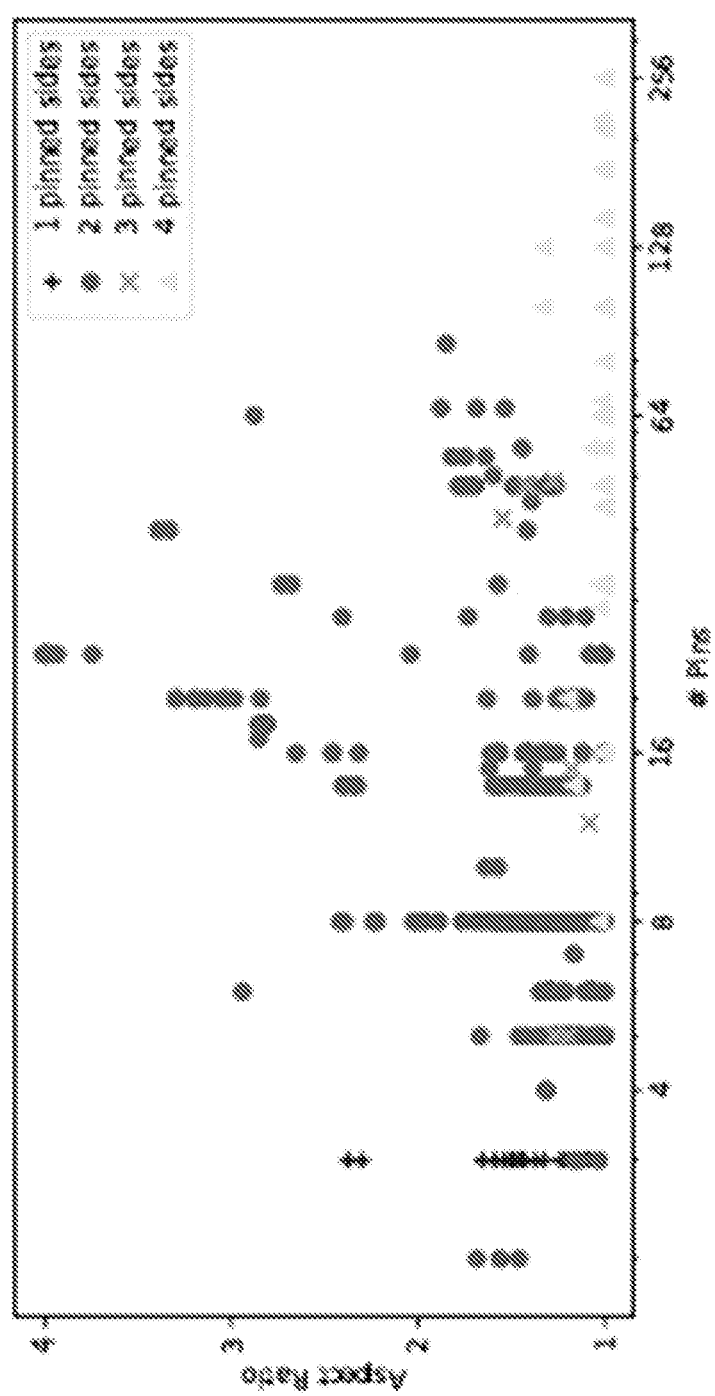

FIG. 9 through FIG. 11 illustrate experimental configurations related to locating SMD pin locations in accordance with some embodiments discussed herein.

Figure 12:
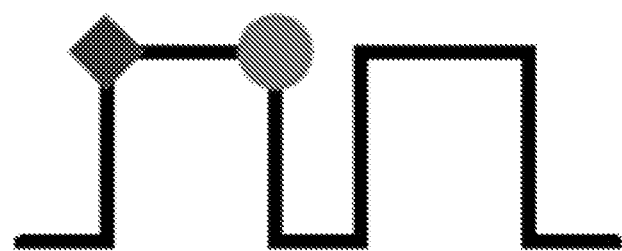

FIG. 12 illustrates an example contour pattern used in identifying potential pin locations in accordance with some embodiments discussed herein.

FIG. 13 illustrates exemplary error categories based on contour characteristics in accordance with some embodiments discussed herein.

DETAILED DESCRIPTION OF SOME EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

General Overview and Exemplary Technical Improvements

Existing techniques have minimally advanced beyond classification of components into groups by their electrical function (e.g., identifying whether a given component image depicts a resistor, capacitor, or IC). Furthermore, such discrete labels reveal minimal explainable information about a component or justification for its selected category. While this form of categorization is useful, it lacks confidence metrics which are tied to understandable BoM properties or assurance characteristics.

Various embodiments of the present disclosure are directed to providing hardware component characterization for AOI systems. Accordingly, various embodiments described herein may determine and provide IC and related class labels with salient information for in-depth component analysis. As an example, knowledge of the number of pins on each package side can be directly evaluated against datasheet specifications for a given sample. As such, a more meaningful assurance objective may be generated rather than merely identifying the electrical category of a device given that there are more quantitative points of comparison for a genuine device.

Furthermore, various embodiments described herein disclose computing systems configured to locate pins of a SMD. The computing systems may identify pins in a SMD image by utilizing image data and points of interest as training data for a machine learning process. As an example, semantic contours obtained in a PCB image collection dataset may be provided as input data to train a computing system to recognize boundaries or contours around an integrated circuit (IC) in an optical image. Accordingly, various embodiments described herein allow for the determination of coordinates on the SMD contours, representative of projected pin locations. As such, in various embodiments, a computing device can identify with high accuracy where pins exist in the contour of an SMD footprint, which can be used for various hardware assurance purposes such as datasheet verification and part database lookups.

Exemplary Technical Implementation of Various Embodiments

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described with reference to example operations, steps, processes, blocks, and/or the like. Thus, it should be understood that each operation, step, process, block, and/or the like may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions.

An example of a prediction-based action that can be performed using the predictive data analysis system 101 is a request for identifying SMD pin characteristics, such as pin locations and dimensions. For example, in accordance with various embodiments of the present invention, a machine learning framework can use various distinct IC specifications to capture predictive insights about various potential segmenting/separation logics that can be imposed on an SMD. This technique will lead to higher accuracy of performing image analysis operations on SMDs comprising pins and dimensions of various sizes and/or with irregularities. In doing so, the techniques described herein improve efficiency and speed of training machine learning models, thus reducing the number of computational operations needed and/or the amount of training data entries needed to train machine learning models. Accordingly, the techniques described herein improve at least one of the computational efficiency, storage-wise efficiency, and speed of training machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry, and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry, and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops), and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionalities that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Exemplary System Operations

Various embodiments of the present disclosure describe steps, operations, processes, methods, functions, and/or the like for identifying pins in a SMD image. In some embodiments, an SMD describes an electrical component, such as an IC, which has been mounted directly onto a surface of a PCB. Unlike other classification tasks that may involve a wide variety of subjects, backgrounds, and morphological characteristics, various embodiments of the presently disclosed SMD pin localization comprises analyzing human-made devices with fewer irregularities, more precise symmetry and predictability.

Referring now to FIG. 4, a flowchart of an example process 400 for locating SMD pin locations is provided. The process 400 includes example operations that may be performed by the apparatus 200, and the apparatus 200 comprises means, such as processing element 205, memories 210 and 215, communications interface 220, and/or the like, for performing the example operations.

In some embodiments, the process 400 begins at step 402, where the apparatus 200 receives input contour data corresponding to a SMD including one or more IC components. FIG. 5 depicts an operational example of input contour data is depicted. As depicted in FIG. 5, input contour data may comprise initial component segmentations 506 of an image 502 of the SMD. For example, the input contour data may comprise an exterior boundary rendering of an outline, or contour, of the SMD, as depicted in element 'a' of FIG. 6.

Referring back to FIG. 5, in some embodiments, the input contour data may be generated through machine learned annotation or neural network outputs 504. A classifier may be trained and generated to create the input contour data using any one of boundary tracing or edge detection techniques known to one of ordinary skill in the art. According to another embodiment, the input contour data of the SMD may be generated by a machine learning model trained based on a PCB image collection dataset including unique PCB images including semantic contours, logo, text, and orientation information along with metadata such as representative text and SMD annotations. In yet another embodiment, input contour data may be generated from imagery using techniques, such as laser interferometry, stereophotogrammetry, light detection and ranging ("LIDAR"), or time-of-flight acquisition. Generating the imagery may include creating pin outlines by defining, e.g., a depth threshold in addition to other thresholds associated with critical dimensions as described herewith. The imagery may comprise depth maps corresponding to surface features of an SMD.

Referring back to FIG. 4, in some embodiments, at step 404, the apparatus 200 determines a plurality of bounding box quadrants for the input contour data. The apparatus 200 may be programmed under an assumption that SMDs are rectangular in determining the bounding box quadrants. Determining the bounding box quadrants may include fitting the input contour data to a rectangular profile comprising a bounding box and using rotating calipers. As such, the bounding box may comprise a rotated rectangle that encapsulates the SMD of the input contour data. By applying a bounding box, the SMD may be normalized against its mounting angle without loss of generality. As such, a 45°-mounted and 0°-mounted SMD can both be treated equivalently without special care taken for their rotation.

A bounding box may be split into, for example, four bounding box quadrants including "left," "right," "top" and "bottom," which group (x,y) contour coordinates associated with pins of the SMD based on the SMD body side they occupy, as depicted by element 'b' in FIG. 6. The grouping of the (x,y) contour coordinates may be determined by an angle between the (x,y) contour coordinates and the bounding box's center. For example, a point in the middle of the left side in element 'b' depicted in FIG. 6 is between the two angles formed by the bounding box exterior and may be labeled as part of the "left" side. Once bounding box quadrants are determined, each of the (x,y) contour coordinates may be assigned a label associated with its respective side.

Referring back to FIG. 4, in some embodiments, at step 406, the apparatus 200 aligns a bounding box comprising the plurality of bounding box quadrants to fit around a body of the SMD associated with the input contour data. After bounding box quadrants have been determined and side labels have been assigned as previously described, a corrective procedure may be performed on sides containing pins. That is, without resizing the bounding box to fit around, for example, the package body of the SMD associated with the input contour data, some pins may be unrecognized due to artifacts from splitting created by the bounding box quadrants.

Referring to FIG. 7, from the exterior bounding box 702 previously determined in step 404, longer pins can be split in half between two sides. This may result in artifacts during processing which prevent robust pin detection at those locations. For example, inset 704 in FIG. 7 may require an adjustment of the bounding box. According to embodiments of the present disclosure, the bounding box may be reduced such that it extends to the SMD body package, rather than the pins themselves. An example of a result of the bounding box alignment is depicted by element 'c' in FIG. 6. As such, bounding box alignment may be performed to reduce the likelihood of a pin becoming divided between two side labels and improves detection of long pins at package boundaries.

Aligning the bounding box may further include adjusting the bounding box to fit just the input contour data (e.g., the SMD) by subtracting from each side of the bounding box the variance of, for example, the middle third contour points. Referring to element 'c' in FIG. 6, top and bottom sides of element 'c' include high variance while variance on the left and right sides of element 'c' are negligible. Alternatively, a subtraction may be performed to shorten the top and bottom sides of the bounding box while leaving the bounding box unmodified on the left and right. Additionally, aligning the bounding box may further ensure that a contour of a given side, for example, comprises one polygon, such that the contour has no holes or multiple separate regions. Other rules for aligning the bounding box may include ensuring that contours are generally convex (e.g., contain no self-intersections, spirals, or large cavities). Generally, on package sides with pins, the pins themselves may constitute the majority of the contour perimeter compared to the package.

Referring back to FIG. 4, in some embodiments, at step 408, the apparatus 200 extracts pin profiles from the input contour data based on the alignment of the bounding box. Contour details on each side of the SMD may be re-orientated and converted into one or more signal representations. For example, extracting the pin profiles may comprise converting and combining the contours from the contour data according to the aligned bounding box into a single data signal.

With reference to element 'c' depicted in FIG. 6, contour points along the top quadrant may remain unmodified while contour points along the left and right quadrants are rotated 90° and −90° respectively, matching the rotation of the top quadrant. Finally, contour points associated with the bottom quadrant are rotated 180°. After this procedure, the transformed points from all sides can be concatenated into a single signal representative of pin profiles where peaks indicate pin locations from the contour data, as depicted by element 'd.' in FIG. 6. One or more signal processing techniques known to one of ordinary skill in the art may be employed to eliminate noise and spurious peaks, including flattening low-variance sides, suppressing non-periodic frequencies, normalizing by sides with the maximum signal height, and filtering by peak prominence.

Referring back to FIG. 4, in some embodiments, at step 410, the apparatus 200 detects signal peak indices from the extracted pin profiles. A peak-finding algorithm may be employed or executed by the apparatus 200 to locate signal peak indices from the extracted pin profiles. Exemplary signal peak indices are shown in element 'e' of FIG. 6. Several metrics may be used to determine false positive rates, and periodicity. Additional contour analysis relating to presence and metrics about each peak, such as height, width, and separation parameters corresponding to the SMD pins may also be performed.

Referring back to FIG. 4, in some embodiments, at step 412, the apparatus 200 maps the signal peak indices to pin locations of the SMD associated with the input contour data. The signal peak indices may be directly associated with actual (x,y) contour coordinates of the SMD. Each peak may be mapped to the input contour data to determine actual (x,y) coordinates of pins. Mapping the signal peak indices to pin locations may comprise generating output contour data. Output contour data may comprise labeling or indicia that are superimposed over the input contour data, for example, as depicted by element 'f' in FIG. 6. Furthermore, the output contour data may enable automated extraction of other BoM properties such as pin width, spacing, and corresponding statistical tolerances that can be readily compared against SMD datasheets.

FIG. 8 presents an exemplary system 800 for inspecting SMDs in accordance with various embodiments of the present disclosure. The system 800 may provide real-time component inspection when PCBs are being assembled. As shown in FIG. 8, one or more integrated circuit(s) 816 and an unpopulated PCB 814 are provided to a surface-mount technology ("SMT") component placement system 802. The one or more integrated circuit(s) 816 and the unpopulated PCB 814 may be provided from, e.g., an assembly line. Mechanical and assembly subsystems 806 may comprise feeders, robotic arms, and conveyor belts for receiving and transporting the one or more integrated circuit(s) 816 and the unpopulated PCB 814 within the SMT component placement system 802 for assembly. The mechanical and assembly subsystems 806 may further comprise hardware for picking, placing, and soldering the one or more integrated circuit(s) 816 and the unpopulated PCB 814 (i.e., mounting the one or more integrated circuit(s) 816 onto the unpopulated PCB 814) with the aid of imaging devices 804 and a computer device 808.

Imaging devices 804 may include cameras, lighting, and connectivity interfaces with the computer device 808. The imaging devices 804 may generate image data comprising images of the unpopulated PCB 814 and the one or more integrated circuit(s) 816. Computer device 808 may provide a computer vision system configured to receive and process the image data from the imaging devices 804 and transmit operational instructions to the mechanical and assembly subsystem(s) 806 based on the processing. The computer device 808 comprises a SMD pin locator module 810 and a quality assurance module 812. The SMD pin locator module 810 may comprise classifiers, machine learning models, or logic for locating SMD pin locations (such as example process 400) according to various embodiments of the present disclosure. The SMD pin locator module 810 may extract and identify SMD pin locations from the image data provided by the imaging devices 804 and transmit the SMD pin locations, e.g., via output contour data, to quality assurance module 812.

Quality assurance module 812 may comprise classifiers, machine learning models, or logic for counterfeit detection and quality assurance. In particular, the quality assurance module 812 may be configured to perform inspections on the one or more integrated circuit(s) 816. According to some embodiments, the SMD pin locations (e.g., output contour data) provided by the SMD pin locator module 810 may be used by quality assurance module 812 to verify IC package and pin dimensions in order to detect counterfeit parts. In other embodiments, the SMD pin locations provided by the SMD pin locator module 810 may be used by quality assurance module 812 to identify components that may be damaged. A populated PCB 818 may be produced based on successful inspection of the one or more integrated circuit(s) 816 by quality assurance module 812. Otherwise, the one or more integrated circuit(s) 816 may be discarded (820).

Accordingly, system 800 allows for real-time identification of counterfeits or trojans as well as real-time quality assurance.

Example Experimental Implementation of Various Embodiments

Identifying pin locations of SMDs and the effectiveness thereof in accordance with various embodiments described herein is experimentally evaluated herein. Example operations executed by a computing device were applied to a testing dataset of 400 IC contours from a PCB image collection dataset with varying package types, annotation quality, pin counts, and aspect ratios. Of these, 51 either were an invalid package type (e.g., circular, partially occluded, etc.), did not possess any pins (e.g., were ball grid arrays (BGAs) or similar package types without visible pin contours), or were too poorly annotated to infer pin locations.

This left 349 samples for testing according to various embodiments described herewith. The testing dataset included a wide variety of package types, aspect ratios, and pin symmetries. Some representative samples are shown in FIG. 9. FIG. 9 presents sample contours from the testing dataset. Different qualities of annotation, pin types, package types, and aspect ratios are represented by the sample contours.

FIG. 10 depicts a histogram of pin counts per sample according to operations performed by the computing device in accordance with various embodiments described herewith. Depending on the package type, pins may appear on a SMD anywhere between one and four sides.

A dataset overview in terms of number of pins, aspect ratio, and number of pinned sides per sample is depicted in FIG. 11, which also depicts the varying aspect ratios present in the testing dataset. Notably, the testing dataset included a large volume of dual in-line packages (DIPs), resulting in a large portion of the dataset with two pinned sides (circles in the plot). While most devices with four pinned sides are square (aspect ratio of one), other package types were widely represented across a range of aspect ratios.

Effectiveness of the various embodiments described herewith was evaluated based on the number of missed, extra, and misplaced pins compared to a ground truth baseline. Depending on the contour resolution, some variation from ground truth was acceptable without incurring a loss penalty. An example of why this may be necessary is described with respect to FIG. 12. To compensate, large distance differences with low index differences are not strongly penalized. That is, in contours with low numbers of vertices, even large differences between predicted and true pin locations can still be considered "correct." For example, FIG. 12 depicts a contour with only four points per pin, where both the far left and far right points can be potential pin locations. Thus, the difference between choosing a left vs. right coordinate should not be penalized.

During error calculation, a first K-dimension (K-D) tree was constructed with ground truth vertices as its nodes. Predicted contour locations were queried against the first K-D tree, and successful matches were recorded. Since extra pins cannot be identified this way, a second K-D tree was created from predicted contour vertices and queried for ground truth points. Indices without ground truth associations were considered extra. Also, since K-D trees record the distance between matches, the quality of an alignment can also be rigorously defined.

When run against annotated data, SMD pin localization according to various embodiments disclosed herewith were able to achieve 99.5% accuracy with 47 missing or extra pins calculated out of 8,963 total pins across all samples (shown in TABLE I). Since few samples contain more than two errors, this accuracy metric was not simply comprised of 1-2 samples where all pins were missed. The reason for these discrepancies is described in further detail with respect to the description of inspecting failure cases in following paragraphs.

TABLE I

Errors per sample and per total pin count across the dataset.

|  | # Samples | # Pins |
|---|---|---|
| Errors | 16 | 47 |
| Total | 349 | 8963 |
| % Accuracy | 95.4 | 99.5 |

The cases where the disclosed SMD pin localization outputs erroneous or missing pins largely consists of five categories as outlined in FIG. 13. In each case, processing according to the various embodiments disclosed herewith either did not hold true or could not distinguish between spurious and relevant contour information.

Package Traits

The presently disclosed SMD pin localization may be based on an assumption of square or rectangular IC packages. When alignment notches or irregularities are present, such an assumption makes it difficult to discriminate between "package bumps" and legitimate pins. However, most package traits are small relative to the pin height and width. Thus, configuring tunable detection thresholds can mitigate these issues if their scale is known beforehand.

Pin Traits

The presently disclosed SMD pin localization may be based on an assumption that pins (i) are the same size on each side, (ii) are somewhat symmetrically spaced, (iii) correspond to one of four package sides, and (iv) are frequently occurring. When these assumptions are strained by contour traits, pins can either be spuriously detected or missed. For example, a diagonal pin may be counted twice—one for each "side" that declared its membership. In a second example, a three-pin transistor with a short middle pin below a certain pin height threshold may not be detected. As with package traits, tunable thresholds may also be configured to account for this factor if a wide variability is expected in pin heights or widths.

Annotation Quality

The testing dataset also comprised a large portion of manually annotated contours and a small portion of automatically segmented regions. Artifacts were present in both cases, manifesting themselves in different forms based on the annotation method. Manual efforts leveraging closed polygons can result in small spikes when the closing vertex is not placed precisely. Raising a threshold for acceptable pin heights and widths may resolve the discrepancy, but this type of annotation noise decreases its output reliability.

More commonly, automatic segmentation methods may produce morphological irregularities based on the quality of the underlying image and the amount of postprocessing involved. The defects that result produce unusual shapes which may violate assumptions about what a contour is expected to look like. For example, referring to FIG. 13, a small spiraling shape in the "annotation quality" category appears as its own pin when transformed according to embodiments discussed herewith. These effects can be drastically reduced either by applying morphological filtering techniques (e.g., closing or opening) or adjusting the tolerance for what constitutes a valid pin.

Design Knowledge

In certain cases, it may not be possible to identify pins versus non-pins by the contour alone. As a result, even portions of a contour which fulfill all assumptions may not be considered a "pin" by design standards. Intuitively, these may be cases where non-expert annotators responsible for marking ground truth pin locations may conflict with each other in whether the pin location should be labeled. Thus, incorporating by additional information such as intimate design details about a specific package type, the disclosed SMD pin localization may correctly delineate these circumstances.

CONCLUSION

Various embodiments address technical challenges related to inefficiencies of existing automated optical inspection techniques that rendered them ineffective or at least restricted in their applicability to surface-mounted devices. Various embodiments utilize hardware-based acceleration to provide explainability, interpretability, and transparency to target machine learning models in a reasonable time. In various embodiments, explainability is provided via a distilled computing process that is generated with improved and significant efficiency through definition of a plurality of transform operations that arrive at features extracted according to embodiments of the present disclosure.

The transform operations are distributed among a plurality of cores or computing units of one or more accelerated hardware elements, such that multiple operations for processing of multiple input-output pairs associated with a target machine learning model can be performed simultaneous or near-simultaneously. As such, various embodiments enable implementation of explainable machine learning in a wide range of domains, including real-time and near real-time applications.

Many modifications and other embodiments of the present disclosure set forth herein will come to mind to one skilled in the art to which the present disclosures pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

The invention claimed is:

1. A method, in a data processing system comprising a processor and a memory, for identifying surface-mount device ("SMD") pin locations, the method comprising:
receiving, by one or more processors, input contour data associated with a SMD;
determining, by the one or more processors, a plurality of bounding box quadrants for the input contour data;
aligning, by the one or more processors, a bounding box around a body of the SMD, wherein the bounding box comprises the plurality of bounding box quadrants;
extracting, by the one or more processors, pin profiles from the input contour data based on the alignment of the bounding box;
detecting, by the one or more processors, signal peak indices from the pin profiles;
mapping, by the one or more processors, the signal peak indices to pin locations associated with the SMD; and
generating, by the one or more processors, output contour data comprising the mapping.

2. The method of claim 1 wherein the input contour data comprises component segmentations of an image of the SMD.

3. The method of claim 1 further comprising generating the input contour data by at least one of: machine learning annotation, neural network outputs, laser interferometry, stereophotogrammetry, light detection and ranging ("LIDAR"), and time-of-flight acquisition.

4. The method of claim 1 further comprising generating the input contour data by using a machine learning model trained based on a printed circuit board ("PCB") image collection dataset, the PCB image collection data including unique PCB images including semantic contours, logo, text, and orientation information.

5. The method of claim 1, wherein determining the plurality of bounding box quadrants further comprises fitting the input contour data to a rectangular profile to encapsulate the SMD.

6. The method of claim 1, wherein the plurality of bounding box quadrants comprises left, right, top, and bottom quadrants that group contour coordinates of the SMD based on a side of the body of the SMD the contour coordinates occupy.

7. The method of claim 6 further comprising grouping a given one of the contour coordinates based on an angle between the given contour coordinate and a center of the bounding box.

8. The method of claim 6 further comprising labeling the contour coordinates based on the side of the body of the SMD the contour coordinates occupy.

9. The method of claim 1, wherein aligning the bounding box further comprises subtracting from each side of the bounding box a variance corresponding to a given portion of contour points.

10. The method of claim 1, wherein extracting the pin profiles further comprises re-orientating and converting contour details from sides of the SMD into one or more signal representations.

11. The method of claim 1, wherein detecting the signal peak indices further comprises executing a peak-finding algorithm to locate the signal peak indices.

12. The method of claim 1, wherein mapping the signal peak indices to pin locations further comprises generating output contour data comprising labeling or indicia superimposed over the input contour data.

13. A computing apparatus comprising memory and one or more processors communicatively coupled to the memory, the one or more processors configured to:
receive input contour data associated with a surface-mount device ("SMD");
determine a plurality of bounding box quadrants for the input contour data;

align a bounding box around a body of the SMD, wherein the bounding box comprises the plurality of bounding box quadrants;
extract pin profiles from the input contour data based on the alignment of the bounding box;
detect signal peak indices from the pin profiles;
map the signal peak indices to pin locations associated with the SMD; and
generate output contour data comprising the mapping.

14. The computing apparatus of claim 13, wherein the one or more processors are further configured to fit the input contour data to a rectangular profile to encapsulate the SMD.

15. The computing apparatus of claim 13, wherein the one or more processors are further configured to subtract from each side of the bounding box a variance corresponding to a given portion of contour points.

16. The computing apparatus of claim 13, wherein the plurality of bounding box quadrants comprises left, right, top, and bottom quadrants that group contour coordinates of the SMD based on a side of the body of the SMD the contour coordinates occupy.

17. The computing apparatus of claim 16, wherein the one or more processors are further configured to group a given one of the contour coordinates based on an angle between the given contour coordinate and a center of the bounding box.

18. The computing apparatus of claim 13, wherein the one or more processors are further configured to re-orientate and convert contour details from sides of the SMD into one or more signal representations.

19. The computing apparatus of claim 13, wherein the one or more processors are further configured to generate output contour data comprising labeling or indicia superimposed over the input contour data.

20. One or more non-transitory computer-readable storage media including instructions that, when executed by one or more processors, cause the one or more processors to:
receive input contour data associated with a surface-mount device ("SMD");
determine a plurality of bounding box quadrants for the input contour data;
align a bounding box around a body of the SMD, wherein the bounding box comprises the plurality of bounding box quadrants;
extract pin profiles from the input contour data based on the alignment of the bounding box;
detect signal peak indices from the pin profiles;
map the signal peak indices to pin locations associated with the SMD; and
generate output contour data comprising the mapping.

* * * * *